(12) United States Patent
Kawakami (10) Patent No.: US 6,476,982 B1
(45) Date of Patent: Nov. 5, 2002

(54) PHOTOGRAPHING LENS SYSTEM

(75) Inventor: Etsuro Kawakami, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/056,644

(22) Filed: Jan. 23, 2002

(30) Foreign Application Priority Data

Jan. 31, 2001 (JP) ...................................... 2001-023544

(51) Int. Cl.$^7$ ................................................. G02B 9/04
(52) U.S. Cl. ...................................................... 359/791
(58) Field of Search ................................. 359/739, 772, 359/773, 784, 786, 791, 741, 745–748, 715, 716

(56) References Cited

U.S. PATENT DOCUMENTS

| | | | | |
|---|---|---|---|---|
| 3,951,523 A | * | 4/1976 | Nishimoto | .................. 359/716 |
| 4,606,607 A | * | 8/1986 | Kurihara | .................. 359/715 |
| 4,659,190 A | * | 4/1987 | Mihara | .................. 359/715 |
| 4,792,216 A | * | 12/1988 | Yoshinobu | .................. 359/715 |
| 4,810,074 A | * | 3/1989 | Kudo et al. | .................. 359/715 |

* cited by examiner

*Primary Examiner*—Evelyn A Lester
(74) *Attorney, Agent, or Firm*—Frishauf, Holtz, Goodman & Chick, P.C.

(57) ABSTRACT

A photographing lens system includes an aperture stop, a first lens group, a second lens group, and a third lens group, in this order from the object. The first lens group includes a positive first lens element, and a negative second lens element which is cemented to or separate from the positive first lens element. The second lens group only includes a positive third lens element having an aspherical surface formed on at least one refractive surface thereof. The third lens group only includes a negative fourth lens element having an aspherical surface formed on at least one refractive surface thereof.

12 Claims, 10 Drawing Sheets

FIG.1

FIG.2A
SPHERICAL ABERRATION

FIG.2B
ASTIGMATISM

FIG.2C
DISTORTION

FIG.3

FIG.4A
SPHERICAL ABERRATION

FIG.4B
ASTIGMATISM

FIG.4C
DISTORTION

FIG.5

FIG.6A
SPHERICAL ABERRATION

FIG.6B
ASTIGMATISM

FIG.6C
DISTORTION

FIG.9

FIG.10A
SPHERICAL ABERRATION

FIG.10B
ASTIGMATISM

FIG.10C
DISTORTION

FIG.11

FIG.12A
SPHERICAL ABERRATION

FIG.12B
ASTIGMATISM

FIG.12C
DISTORTION

PHOTOGRAPHING LENS SYSTEM

BACKGROUND OF THE INVENTION

1. Field of the Invention

The present invention relates to a high-performance and compact photographing lens system to be utilized in a small imaging apparatus, such as digital still cameras, surveillance cameras, and PC cameras (an imaging apparatus for a personal computer), in which an imaging device, such as a CCD (charged coupled device), is used.

2. Description of the Prior Art

In recent years, general-use digital still cameras (hereinafter, DSC) have rapidly spread in the market. From a structural point of view, a DSC is an imaging apparatus which electrically picks up a still image formed by a photographing lens system through an imaging device such as a CCD or the like (hereinafter, CCD), and records the picked-up image in a built-in memory or a memory card. When DSCs were first available in the market, they obtained popularity, since a liquid crystal monitor thereof was able to be used either as a finder for a photographing operation or as a monitor on which recorded images were reproduced. With these features, i.e., promptness and convenience, DSCs, attracted more users, than cameras with a silver halide film did. On the other hand, compared with the silver-halide-film cameras, the DSCs have low resolution of the photographic image, which is considered to be a drawback thereof. Along with rapid spread of DSCs, CCDs having a large number of pixels have been supplied at low cost. As a result, although under some limited conditions such as the size of print paper used, etc., DSCs have been improved to the extent that the resolution thereof is closer to that of silver-halide-film cameras, and these improved DSCs have been produced and sold as products.

Here, a conventional photographing lens system of a DSC is discussed. Since an image is picked up by a CCD with a large number of pixels, it is understood that the structure of the photographing lens system is similar to a photographing lens system of a video tape recorder (VTR). However, higher performance is required with respect to resolution and quality of image, so that it is often the case that the structure of the conventional photographing lens system of a DSC is complicated. Furthermore, with respect to the size of the optical system, the photographing lens system of a DSC inevitably becomes larger than that of a VTR, even under the condition that the size of the image pick-up surface of CCD of a DSC is the same as that of a VTR. The characteristics of a conventional photographing lens system of a DSC are itemized as follows:

1. High Picture Quality

In recent years, even for general-use DSCs, the number of pixels has reached 3 to 4 millions. If the difference in the dimensions of the pick-up surfaces between DSCs and VTRs is ignored, the number of pixels of a DSC is ten times larger than that of a VTR. Similarly, it is understood that the precision (difficulty) on the correcting of aberrations, required for the photographing lens systems of a DSC and a VTR, may have such an amount of difference therebetween.

In order to increase the number of pixels in a CCD, an attempt has been made to make the size of the pixels themselves smaller, i.e., reducing a pitch of pixels, without increasing the dimensions of the image pick-up surface as much as possible. For example, in a recently released CCD, having the effective pixel number of a 1.3 million, to be used for a DSC, the pixel pitch in the CCD is about 4.2 $\mu$m.

Accordingly, assuming that the diameter of the minimum circle of confusion is double the pixel pitch, the diameter of the minimum circle of confusion is 8.4 $\mu$m. Since the diameter of the minimum circle of confusion of a 35 mm-format silver-halide-film camera is about 33 $\mu$m, it can be said that the resolution required for the photographing lens system of a DSC is about four times higher than that of a silver-halide-film camera.

2. Suitable Telecentricity on the Image Side

Telecentricity on the image side means a state in which principal rays of light bundles, with respect to each image point, become substantially parallel with the optical axis after being emitted from the final lens surface of an optical system, i.e., the principal rays are substantially normal to the image plane. In other words, the position of the exit pupil of the optical system is sufficiently distant from the image plane. This arrangement is necessary in order to avoid the reduction of the effective aperture efficiency (shading). More specifically, since a color filter on the CCD is slightly distant from the image pick-up surface, if light rays inclined with respect to the optical axis are incident on the color filter, the aperture efficiency is decreased, i.e., shading occurs. In particular, in the case of recent CCDs with high-sensitivity, many of the CCDs are provided with a micro-lens array in front of the image pick-up surface. However, in such a case as well, if the exit pupil is not sufficiently distant the image plane, the aperture efficiency around the periphery is lowered.

3. Long Back Focal Distance Necessary

Not limited to a space for a protective glass plate required according to the structure of a CCD, spaces for some optical elements are generally required between the photographing lens system and the CCD. Such optical elements are, for example, an optical low-pass filter (OLPF) which is inserted for the purpose of preventing a moire effect and the like due to the superlattice (grid pattern) structure of the CCD, and an infrared absorption filter inserted between the photographing lens system and the CCD for the purpose of lowering the sensitivity of the CCD in the infrared wavelength range so that the sensitivity thereof become closer to the spectral luminous efficiency of the human eye.

As explained, the photographing lens system of a conventional DSC has the above-described three characteristics (conditions). In regard to item 2 (Suitable Telecentricity on the Image Side), the arrangement of the color filter and micro-lens array of the CCD has been reexamined. In regard to item 3 (Long Back Focal Distance Necessary), materials for the OLPF and other optical elements have been reexamined, and the structure of a CCD has also been reexamined from the fundamental viewpoint. According to these activities, there has been a symptom of improvement on the photographing lens system of a DSC. Due to room for design which is obtained by the above activities, an engineering environment in which development of the photographing lens system of a DSC can be made by taking compactness and cost-effectiveness into consideration.

SUMMARY OF THE INVENTION

In view of the above-mentioned drawbacks, an object of the present invention is to provide a compact photographing lens system which attains high resolution, and smaller number of lens elements.

As a preferable aspect of the present invention, a photographing lens system includes an aperture stop, a first lens group, a second lens group, and a third lens group, in this order from the object side. The first lens group includes a positive first lens element having positive refractive power, and a negative second lens element having a negative refractive power which is cemented to or separate from the positive first lens element. The second lens group includes a positive third lens element having an aspherical surface formed on at least one refractive surface thereof. The third lens group includes a negative fourth lens element having an aspherical surface formed on at least one refractive surface thereof. The photographing lens system satisfies condition (1) with respect to the power of the first lens group, and satisfies condition (2) with respect to the dimensions of the entire photographing lens system along the optical axis. By satisfying conditions (1) and (2), a compact photographing lens system, which attains high resolution, and smaller number of lens elements, can be obtained.

$$0.8 < f_I/f < 2.8 \tag{1}$$

$$TL/f < 1.7 \tag{2}$$

wherein f designates the combined focal length of the entire photographing lens system (i.e., the focal length of all the lens groups of the photographing lens system);

$f_I$ designates the focal length of the first lens group (i.e., the focal length of all the lens elements of the first lens group); and TL designates the distance between the most object-side surface of the aperture stop and the image plane.

The photographing lens system further includes a plane-parallel plate. When the distance TL is calculated, the thickness of the plane-parallel plate is calculated as an equivalent air thickness (a reduced distance defined by d/n; d: the thickness of the plane-parallel plate; n: the refractive index thereof).

A basic characteristic of the lens arrangement of the photographing lens system according to the present invention resides in the first lens group having strong positive power as defined by condition (1), the second lens group having weak positive power, and the third lens group having weak negative power, i.e., the photographing lens system has a positive-positive-negative 'telescopic type' arrangement. Furthermore, for the purpose of correcting chromatic aberration, the first lens group having strong power mainly functions as an achromatic lens group. Accordingly, the first lens group functions to correct spherical aberration, coma, and chromatic aberration in the paraxial region; and the second and third lens groups function to correct off-axis aberration, such as distortion, and to maintain telecentricity suitably.

In the above lens arrangement, condition (1) specifies the power of the first lens group.

If $f_I$ becomes larger to the extent that $f_I/f$ exceeds the upper limit of condition (1), the power of the second and third lens groups, each of which is constituted by a single lens element, has to be increased. As a result, chromatic aberration largely occurs.

If $f_I$ becomes smaller to the extent that $f_I/f$ exceeds the lower limit of condition (1), the power of the first lens group becomes too strong. As a result, spherical aberration and coma largely occur. Furthermore, the radius of curvature of the spherical surfaces of lens elements constituting the first lens group becomes smaller, so that manufacture thereof becomes difficult.

Condition (2) specifies the overall length of the photographing lens system, and relates to miniaturization thereof.

If TL/f exceeds the upper limit of condition (2), it is advantageous for the correcting of aberrations; however, it is against miniaturization of the photographing lens system.

Furthermore, the positive first lens element of the first lens group preferably satisfies condition (3) with respect to the shape of the object-side surface of the positive first lens element. The positive first lens element and the negative second lens element of the first lens group satisfy condition (4) with respect to the Abbe number.

$$0.45 < r_{I-1}/f < 0.8 \tag{3}$$

$$10 < v_{I-1} - v_{I-2} < 25 \tag{4}$$

wherein $r_{I-1}$ designates the radius of curvature on the object-side surface of the positive first lens element;

$v_{I-1}$ designates the Abbe number of the positive first lens element; and $v_{I-2}$ designates the Abbe number of the negative second lens element.

Condition (3) specifies the shape of the first lens group, which substantially means the correcting of spherical aberration and coma.

If $r_{I-1}/f$ exceeds the lower limit of condition (3), negative spherical aberration excessively occurs, and the negative spherical aberration cannot be corrected on the image-side surface of the positive first lens element and thereafter.

If $r_{I-1}/f$ exceeds the upper limit of condition (3), the principal points are moved toward the image, so that miniaturization of the photographing lens system becomes difficult.

Condition (4) is for achromatic requirements of the first lens group having strong power.

If $v_{I-1} - v_{I-2}$ exceeds the lower limit of condition (4), the positive power of the positive first lens element and the negative power of the negative second lens element become too strong, so that monochromatic aberration and machining problems occur.

If $v_{I-1} - v_{I-2}$ exceeds the upper limit of condition (4), monochromatic aberration due to reduction of the refractive index of the positive first lens element excessively occurs.

In addition to the above, the positive second lens group preferably satisfies condition (5) with respect to the power thereof. Moreover, the positive third lens element of the second lens group satisfies condition (6) with respect to the shape of the object-side refractive surface thereof.

$$0.7 < f_{II}/f < 3.5 \tag{5}$$

$$0.5 < |r_{II-1}|/f < 3.0 \, (r_{II-1} < 0) \tag{6}$$

wherein $f_{II}$ designates the combined focal length of the second lens group (i.e., the focal length of all the lens elements of the second lens group); and $r_{II-1}$ designates the radius of curvature on the object-side surface of the positive third lens element.

A characteristic of the second lens group resides in the weak positive power thereof as defined by condition (2), by which the correcting of off-axis aberrations can be made, while the power of the first lens group is weakened.

If $f_{II}$ becomes larger to the extent that $f_{II}/f$ exceeds the upper limit of condition (5), the power burden on the first lens group becomes larger, so that the correcting of axial aberrations becomes difficult.

If $f_{II}$ becomes smaller to the extent that $f_{II}/f$ exceeds the lower limit of condition (5), chromatic aberration excessively occurs in the second lens group, so that optical performance in an off-axis region particularly deteriorates.

Condition (6) specifies the shape of the second lens group. The second lens group needs to be formed in the shape of a positive meniscus lens element, with weak positive power, having the convex surface facing toward the image.

If $|r_{II-1}|/f$ exceeds the upper limit of condition (6), the angle of off-axis principle rays becomes too small. As a result, telecentricity deteriorates, since the third lens group cannot correct this error.

If $|r_{II-1}|/f$ exceeds the lower limit of condition (6), it is advantageous for telecentricity; however, off-axis coma flare increases largely, and optical performance deteriorates.

Furthermore, the third lens group preferably satisfies condition (7) with respect to the power thereof. Moreover, the negative fourth lens element of the third lens group satisfies condition (8) with respect to the shape of the image-side refractive surface thereof.

$$2.5 < |f_{III}|/f < 50 \quad (f_{III} < 0) \tag{7}$$

$$0.5 < r_{III-2}/f < 1.5 \tag{8}$$

wherein $f_{III}$ designates the combined focal length of the third lens group (i.e., the focal length of all the lens elements of the third lens group); and $r_{III-2}$ designates the radius of curvature on the image-side surface of the negative fourth lens element.

The third lens group has a weak negative power as defined by condition (7), and functions to correct distortion and an error of telecentricity, especially in the peripheral areas.

Condition (7) specifies the power of the third lens group.

If the power of the third lens group becomes weaker to the extent that $|f_{III}|/f$ exceeds the upper limit of condition (7), the telephoto ratio for the entire photographing lens system deteriorates, so that miniaturization thereof becomes difficult.

If $|f_{III}|/f$ exceeds the lower limit of condition (7), it is advantageous for miniaturization; however, it is disadvantageous for distortion and telecentricity in peripheral areas.

Condition (8) specifies the third lens group with respect to the shape of an area thereof in the vicinity of an axial light bundle. By satisfying this condition, the image-side surface of the third lens group has a negative power.

If $r_{III-2}/f$ exceeds the upper limit of condition (8), the negative power of the image-side surface of the third lens group becomes weaker, so that it is disadvantageous for miniaturization of the photographing lens system.

If $r_{III-2}/f$ exceeds the lower limit of condition (8), the shapes of the image-side surface of the third lens group on the central area and on the peripheral area differ largely, so that the change in optical performance from the center of the image plane toward the peripheral thereof is undesirably increased.

Still further, it is preferable that the positive third lens element constituting the second lens group and the negative fourth lens element constituting the third lens group be made from a resin material.

BRIEF DESCRIPTION OF THE DRAWINGS

The present invention will be discussed below in detail with reference to the accompanying drawings, in which.

DESCRIPTION OF THE PREFERRED EMBODIMENTS

The present invention is herein described with respect to specific numerical embodiments. In each of the following first to tenth embodiments, the photographing lens system include an aperture stop S, a first lens group LG1, a second lens group LG2 and a third lens group LG3, in this order from the object. The first lens group LG1 includes a positive first lens element L1 and a negative second lens element L2, in this order from the object side; the second lens group LG2 only includes a positive third lens element L3; and the third lens group LG3 only includes a negative fourth lens element L4. A plane-parallel plate LP is provided between the negative fourth lens element L4 and the image plane without contacting both the negative fourth lens element L4 and the image plane. The plane-parallel plate LP is the substitution of a crystal optical filter and an infrared absorption filter in an actual lens system. Further, the plane-parallel plate LP is described, for the purpose of clarity, as a single plane-parallel glass plate having uniform thickness over the entire area thereof, which is the substitution of a crystal optical filter and an infrared absorption filter in an actual lens system. Such a clarity does not cause any adverse influence on optical explanations of the present invention.

The positive first lens element L1 and the negative second lens element L2 of the first lens group LG1 can be either cemented to each other or can be separate from each other. In the first through seventh, and ninth embodiments, the positive first lens element L1 and the negative second lens element L2 are cemented together; and in the eighth and tenth embodiments, the positive first lens element L1 and the negative second lens element L2 are provided separately.

The positive third lens element L3 constituting the second lens group LG2, and the negative fourth lens element L4 constituting the third lens group LG3, are made from a resin material.

In regard to an aspherical surface which is utilized in each embodiment, the aspherical surface, as well known in the art, can be defined by the following aspherical formula, assuming that the Z axis extends along the optical axis direction, and the Y axis extends along a direction perpendicular to the optical axis:

$$Z=(Y^2/r)[1+\{1-(1+K)(Y/r)^2\}^{1/2}]+AY^4+BY^6+CY^8+DY^{10}$$

Namely, the aspherical surface is a curved surface obtained by rotating the curved line defined by the above formula about the optical axis. The shape of the aspherical surface is defined by a paraxial radius of curvature r, a conic constant K, and higher-order aspherical surface coefficients A, B, C and D.

Embodiment 1

Figure 1:
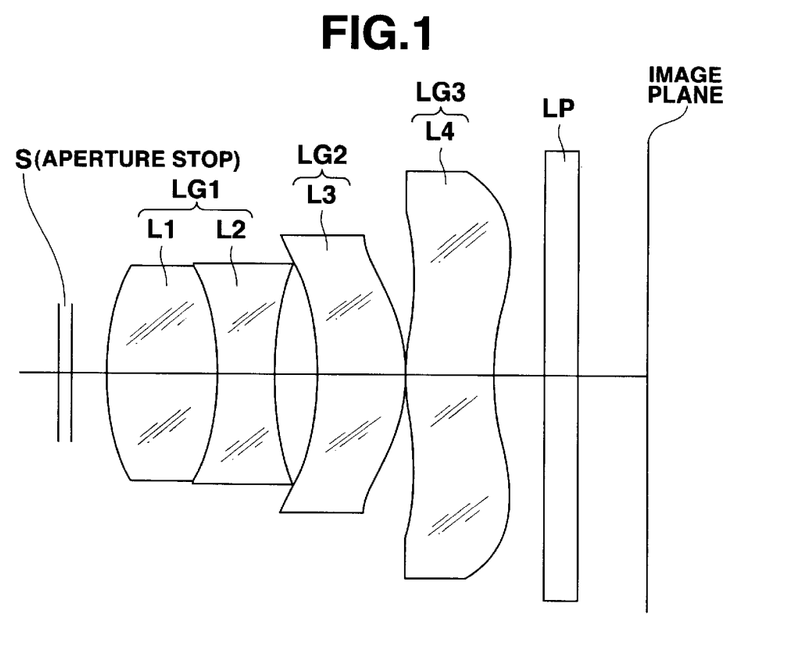
FIG. 1 is a lens arrangement of a photographing lens system according to a first embodiment of the present invention.
Figure 2A:
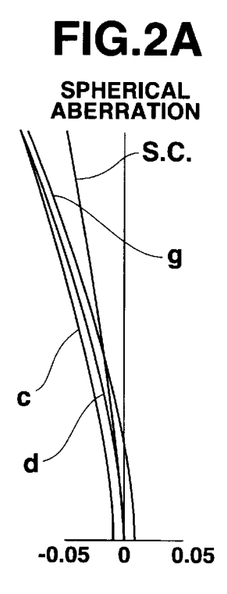
FIGS. 2A, 2B and 2C show aberrations occurred in the photographing lens system shown in FIG. 1.
Figure 2B:
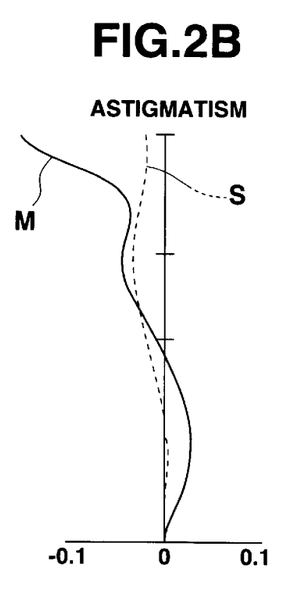
Figure 2C:
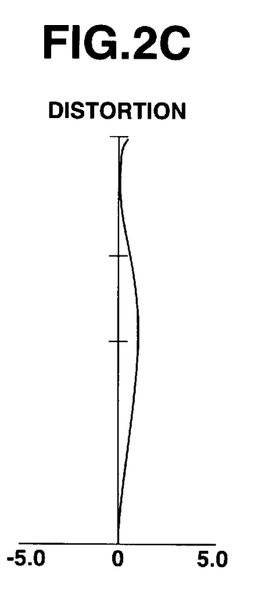

FIG. 1 is the lens arrangement of the photographing lens system according to the first embodiment of the present invention. Table 1 shows the numerical values for the photographing lens system according to the first embodiment. FIGS. 2A to 2C show aberrations occurred in the photographing lens system shown in FIG. 1 and Table 1.

In the tables and drawings, f designates the focal length of the entire photographing lens system; $F_{NO}$ designates the F-number; $2\omega$ designates the full angle of view of the photographing lens system; and $b_f$ designates the back focal distance which is the reduced distance from the image-side surface of the negative fourth lens element of the third lens group to the image plane, namely, the thickness of the plane-parallel plate LP is converted to the reduced distance; R designates the radius of curvature, D designates the lens thickness or distance between lenses, $N_d$ designates the refractive index of the d-line, and $v_d$ designates the Abbe number. In the spherical aberration diagrams, d, g, and C designate aberration curves at their respective wavelengths, and S.C. designates the sine condition. Furthermore, in the astigmatism diagrams, S and M designate sagittal and meridional, respectively.

TABLE 1

| | | f = 5.70 | | | |
| | | $F_{NO}$ = 2.85 | | | |
| | | $2_\omega$ = 61.39° | | | |
| | | $b_f$ = 2.02 | | | |
| Surf.No. | R | D | $N_d$ | $v_d$ | |
|---|---|---|---|---|---|
| S1 | ∞ | 0.20 | — | — | Aperture Stop |
| S2 | ∞ | 0.46 | — | — | |
| 1 | 3.663. | 1.56 | 1.83500 | 42.98 | 1st Lens Group |
| 2 | −3.704 | 0.81 | 1.74077 | 27.76 | |

TABLE 1-continued

| 3 | 4.756 | 0.64 | — | — | |
|---|---|---|---|---|---|
| 4* | −3.704 | 1.21 | 1.49241 | 57.93 | 2nd Lens Group |
| 5* | −2.503 | 0.03 | — | — | |
| 6* | 4.599 | 1.24 | 1.49241 | 57.93 | 3rd Lens Group |
| 7* | 3.336 | 0.69 | — | — | |
| 8 | ∞ | 0.50 | 1.51680 | 64.20 | Plane-Parallel Plate |
| 9 | ∞ | — | — | — | |

*designates the aspherical surface which is rotationally symmetrical with respect to the optical axis.

Aspherical surface data (the aspherical surface coefficients not indicated are zero (0.00)):
Surface No.4
  $K=-0.238604\times10^2$
  $A=-0.409849\times10^{-1}$
  $B=0.616592\times10^{-2}$
Surface No.5
  $K=-0.738406\times10$
  $A=-0.381281\times10^{-1}$
  $B=0.504072\times10^{-2}$
  $C=0.607261\times10^{-3}$
  $D=0.688523\times10^{-4}$
Surface No.6
  $K=0.225228\times10$
  $A=-0.353667\times10^{-1}$
  $B=0.203259\times10^{-2}$
  $C=0.685038\times10^{-4}$
  $D=-0.386813\times10^{-4}$
Surface No.7
  $K=-0.115784\times10^2$
  $A=-0.498743\times10^{-2}$
  $B=-0.264256\times10^{-2}$
  $C=0.374355\times10^{-3}$
  $D=-0.229586\times10^{-4}$ Embodiment 2

Figure 3:
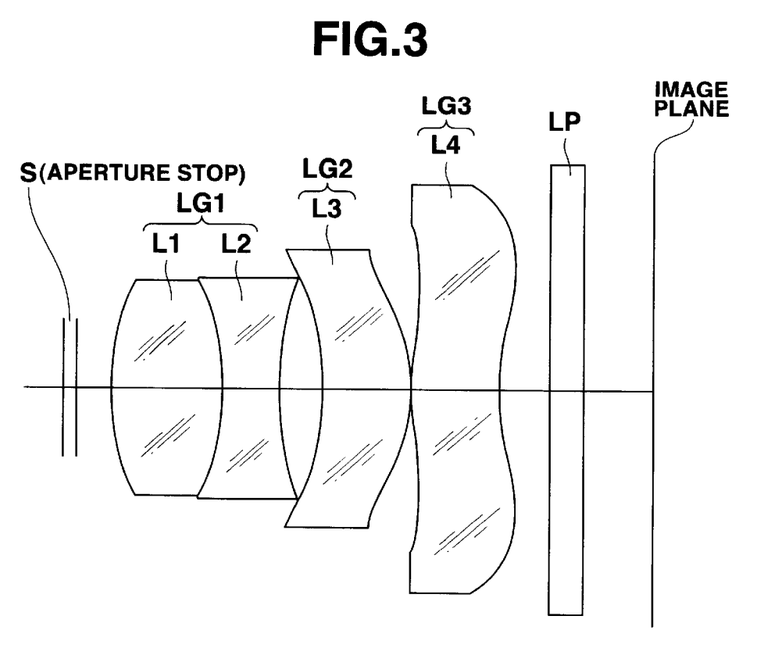
FIG. 3 is a lens arrangement of a photographing lens system according to a second embodiment of the present invention.
Figure 4A:
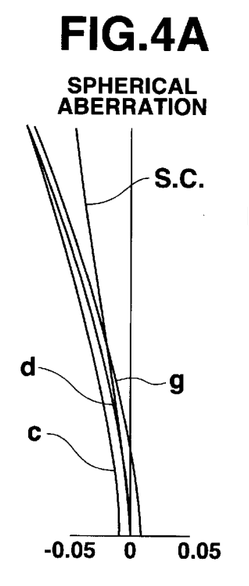
FIGS. 4A, 4B and 4C show aberrations occurred in the photographing lens system shown in FIG. 3.
Figure 4B:
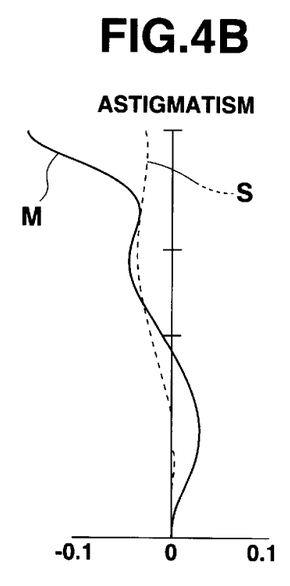
Figure 4C:
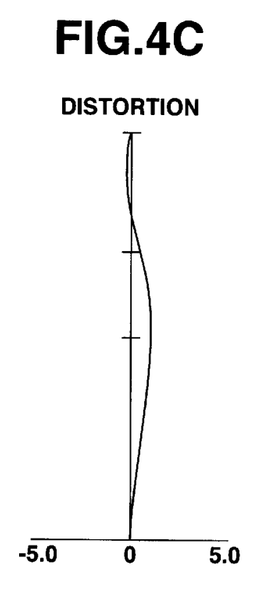

FIG. 3 is the lens arrangement of the photographing lens system according to the second embodiment of the present invention. Table 2 shows the numerical values for the photographing lens system according to the second embodiment. FIGS. 4A to 4C show aberrations occurred in the photographing lens system shown in FIG. 3 and Table 2.

TABLE 2

| | | f = 5.70 | | | |
| | | $F_{NO}$ = 2.85 | | | |
| | | $2_\omega$ = 61.57° | | | |
| | | $b_f$ = 2.01 | | | |
| Surf.No. | R | D | $N_d$ | $v_d$ | |
|---|---|---|---|---|---|
| S1 | ∞ | 0.20 | — | — | Aperture Stop |
| S2 | ∞ | 0.46 | — | — | |
| 1 | 3.555 | 1.58 | 1.80420 | 46.50 | 1st Lens Group |
| 2 | −3.704 | 0.79 | 1.71736 | 29.50 | |
| 3 | 4.673 | 0.66 | — | — | |
| 4* | −3.704 | 1.13 | 1.49241 | 57.93 | 2nd Lens Group |
| 5* | −2.500 | 0.03 | — | — | |
| 6* | 4.563 | 1.27 | 1.49241 | 57.93 | 3rd Lens Group |
| 7* | 3.333 | 0.68 | — | — | |
| 8 | ∞ | 0.50 | 1.51680 | 64.20 | Plane-Parallel Plate |
| 9 | ∞ | — | — | — | |

TABLE 2-continued

*designates the aspherical surface which is rotationally symmetrical with respect to the optical axis.

Aspherical surface data (the aspherical surface coefficients not indicated are zero (0.00)):

Surface No.4
- $K=-0.273406\times10^2$
- $A=-0.481512\times10^{-1}$
- $B=0.772532\times10^{-2}$ Surface No.5
- $K=-0.709931\times10$
- $A=-0.448838\times10^{-1}$
- $B=0.459242\times10^{-2}$
- $C=0.159828\times10^{-2}$
- $D=-0.439389\times10^{-4}$ Surface No.6
- $K=0.218266\times10$
- $A=-0.437321\times10^{-1}$
- $B=0.445057\times10^{-2}$
- $C=-0.143319\times10^{-3}$
- $D=-0.332092\times10^{-4}$ Surface No.7
- $K=-0.106254\times10^2$
- $A=-0.685063\times10^{-2}$
- $B=-0.256520\times10^{-2}$
- $C=0.401139\times10^{-3}$
- $D=-0.247862\times10^{-4}$

Embodiment 3

Figure 5:
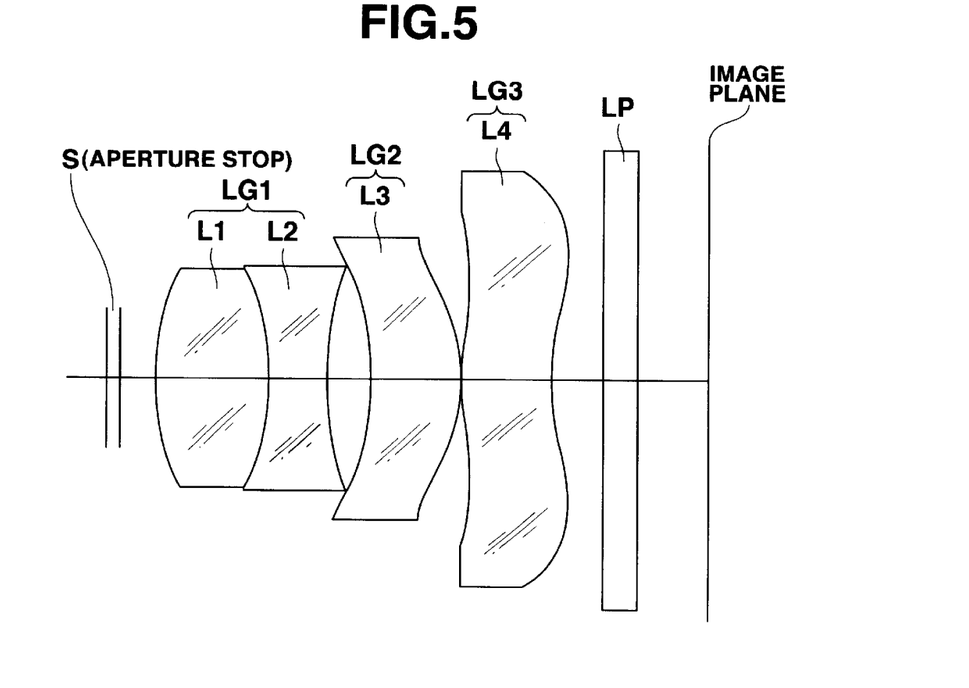
FIG. 5 is a lens arrangement of a photographing lens system according to a third embodiment of the present invention.
Figure 6A:
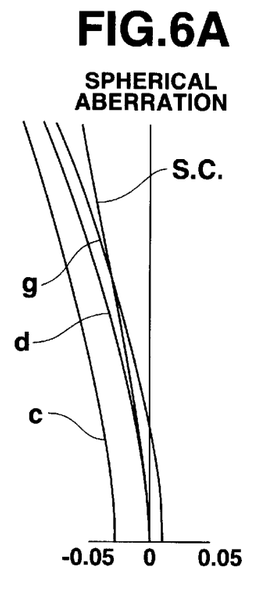
FIGS. 6A, 6B and 6C show aberrations occurred in the photographing lens system shown in FIG. 5.
Figure 6B:
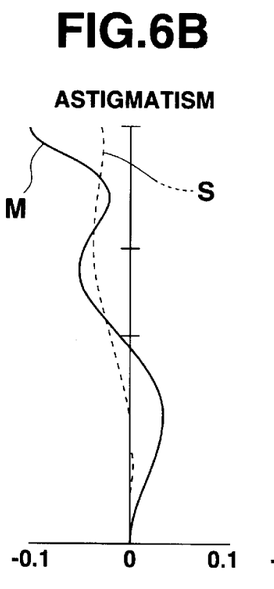
Figure 6C:
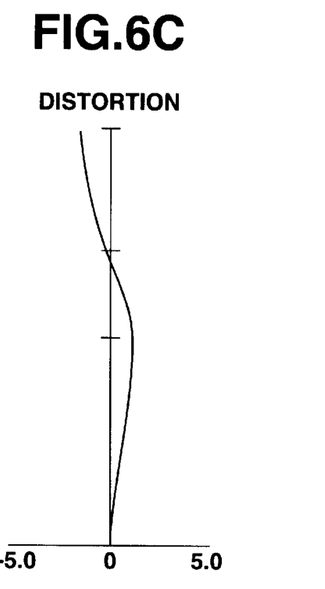

FIG. 5 is the lens arrangement of the photographing lens system according to the third embodiment of the present invention. Table 3 shows the numerical values for the photographing lens system according to the third embodiment. FIGS. 6A to 6C show aberrations occurred in the photographing lens system shown in FIG. 5 and Table 3.

TABLE 3

$f = 5.71$
$F_{NO} = 2.85$
$2\omega = 62.42°$
$b_f = 2.06$

| Surf.No. | R | D | $N_d$ | $v_d$ | |
|---|---|---|---|---|---|
| S1 | ∞ | 0.20 | — | — | Aperture Stop |
| S2 | ∞ | 0.50 | — | — | |
| 1 | 3.547 | 1.62 | 1.80610 | 40.73 | 1st Lens Group |
| 2 | -3.704 | 0.63 | 1.75520 | 27.53 | |
| 3 | 4.955 | 0.76 | — | — | |
| 4* | -3.704 | 0.99 | 1.49241 | 57.93 | 2nd Lens Group |
| 5* | -2.641 | 0.03 | — | — | |
| 6* | 3.940 | 1.39 | 1.49241 | 57.93 | 3rd Lens Group |
| 7* | 3.333 | 0.73 | — | — | |
| 8 | ∞ | 0.50 | 1.51680 | 64.20 | Plane-Parallel Plate |
| 9 | ∞ | — | — | — | |

*designates the aspherical surface which is rotationally symmetrical with respect to the optical axis.

Aspherical surface data (the aspherical surface coefficients not indicated are zero (0.00)):

Surface No.4
- $K=-0.263402\times10^2$
- $A=-0.421624\times10^{-1}$
- $B=0.771079\times10^{-2}$ Surface No.5
- $K=-0.685663\times10$
- $A=-0.466761\times10^{-1}$
- $B=0.637307\times10^{-2}$
- $C=0.161927\times10^{-2}$
- $D=-0.100155\times10^{-3}$ Surface No.6
- $K=0.113976\times10$
- $A=-0.468391\times10^{-1}$
- $B=0.608638\times10^{-2}$
- $C=-0.390763\times10^{-3}$
- $D=-0.131357\times10^{-4}$ Surface No.7
- $K=-0.225807\times10$
- $A=-0.210184\times10^{-1}$
- $B=-0.901193\times10^{-4}$
- $C=0.186714\times10^{-3}$
- $D=-0.153064\times10^{-4}$

Embodiment 4

Figure 7:
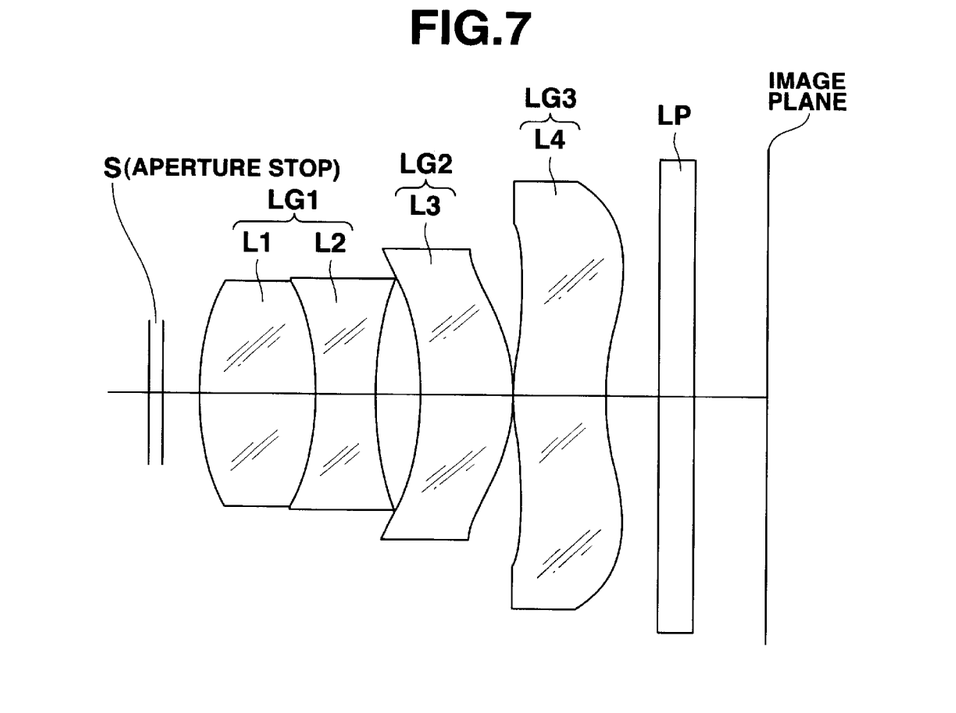
FIG. 7 is a lens arrangement of a photographing lens system according to a fourth embodiment of the present invention.
Figures 8A, 8B:
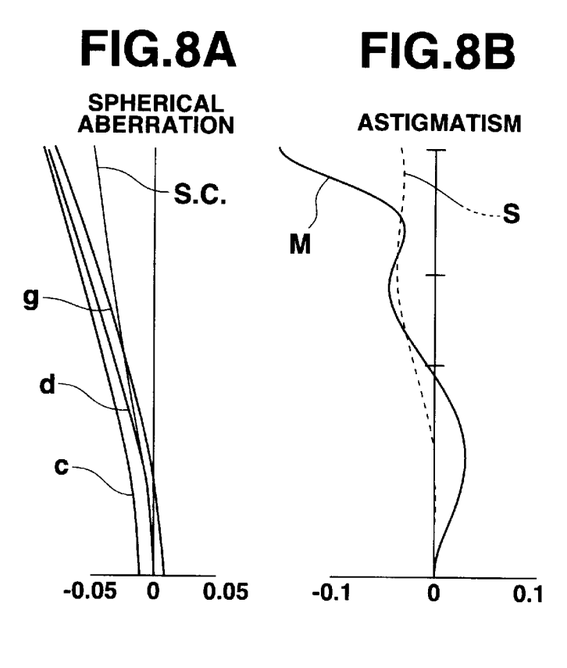
FIGS. 8A, 8B and 8C show aberrations occurred in the photographing lens system shown in FIG. 7.
Figure 8C:
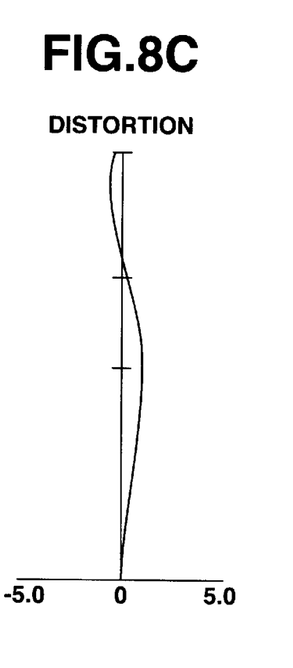

FIG. 7 is the lens arrangement of the photographing lens system according to the fourth embodiment of the present invention. Table 4 shows the numerical values for the photographing lens system according to the third embodiment. FIGS. 8A to 8C show aberrations occurred in the photographing lens system shown in FIG. 7 and Table 4.

TABLE 4

$f = 5.70$
$F_{NO} = 2.85$
$2\omega = 61.80°$
$b_f = 2.02$

| Surf.No. | R | D | $N_d$ | $v_d$ | |
|---|---|---|---|---|---|
| S1 | ∞ | 0.20 | — | — | Aperture Stop |
| S2 | ∞ | 0.53 | — | — | |
| 1 | 3.472 | 1.65 | 1.77250 | 49.62 | 1st Lens Group |
| 2 | -3.704 | 0.68 | 1.68893 | 31.16 | |
| 3 | 4.750 | 0.69 | — | — | |
| 4* | -3.704 | 1.06 | 1.49241 | 57.93 | 2nd Lens Group |
| 5* | -2.529 | 0.03 | — | — | |
| 6* | 4.585 | 1.30 | 1.49241 | 57.93 | 3rd Lens Group |
| 7* | 3.333 | 0.69 | — | — | |
| 8 | ∞ | 0.50 | 1.51680 | 64.20 | Plane-Parallel Plate |
| 9 | ∞ | — | — | — | |

*designates the aspherical surface which is rotationally symmetrical with respect to the optical axis.

Aspherical surface data (the aspherical surface coefficients not indicated are zero (0.00)):

Surface No.4
- $K=-0.272400\times10^2$
- $A=-0.476867\times10^{-1}$
- $B=0.793990\times10^{-2}$ Surface No.5
- $K=-0.716327\times10$
- $A=-0.454329\times10^{-1}$
- $B=0.484399\times10^{-2}$
- $C=0.172058\times10^{-2}$
- $D=-0.631145\times10^{-4}$ Surface No.6
- $K=0.227596\times10$
- $A=-0.444725\times10^{-1}$
- $B=0.463605\times10^{-2}$ C=−0.179788×10⁻³

C=$-0.179788 \times 10^{-3}$
D=$-0.331469 \times 10^{-4}$
Surface No.7
  K=$-0.969570 \times 10$
  A=$-0.712233 \times 10^{-2}$
  B=$-0.256207 \times 10^{-2}$
  C=$0.404195 \times 10^{-3}$
  D=$-0.250002 \times 10^{-4}$

Embodiment 5

Figure 9:
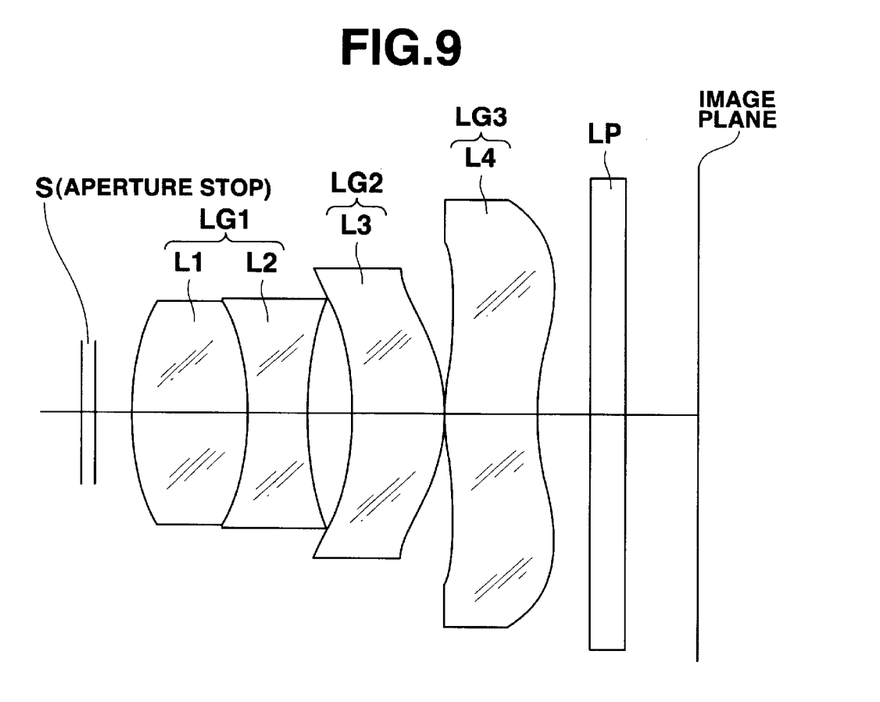
FIG. 9 is a lens arrangement of a photographing lens system according to a fifth embodiment of the present invention.
Figure 10A:
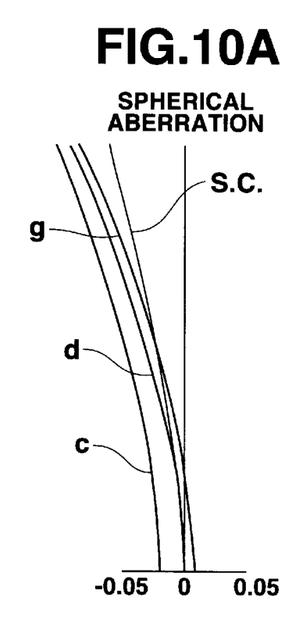
FIGS. 10A, 10B and 10C show aberrations occurred in the photographing lens system shown in FIG. 9.
Figure 10B:
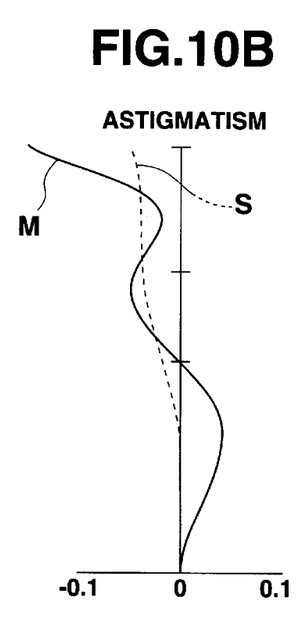
Figure 10C:
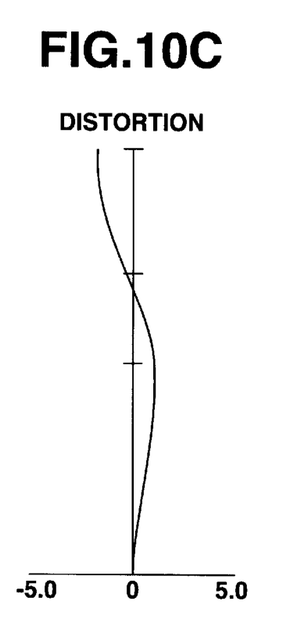

FIG. 9 is the lens arrangement of the photographing lens system according to the fifth embodiment of the present invention. Table 5 shows the numerical values for the photographing lens system according to the fourth embodiment. FIGS. 10A to 10C show aberrations occurred in the photographing lens system shown in FIG. 9 and Table 5.

TABLE 5

$f = 5.71$
$F_{NO} = 2.85$
$2\omega = 62.49°$
$b_f = 2.05$

| Surf.No. | R | D | $N_d$ | $v_d$ | |
|---|---|---|---|---|---|
| S1 | ∞ | 0.20 | — | — | Aperture Stop |
| S2 | ∞ | 0.58 | — | — | |
| 1 | 3.333 | 1.74 | 1.71300 | 53.94 | 1ˢᵗ Lens Group |
| 2 | −3.704 | 0.54 | 1.64769 | 33.84 | |
| 3 | 4.948 | 0.70 | — | — | |
| 4* | −3.704 | 0.95 | 1.49241 | 57.93 | 2ⁿᵈ Lens Group |
| 5* | −2.609 | 0.03 | — | — | |
| 6* | 4.334 | 1.41 | 1.49241 | 57.93 | 3ʳᵈ Lens Group |
| 7* | 3.333 | 0.72 | — | — | |
| 8 | ∞ | 0.50 | 1.51680 | 64.20 | Plane-parallel Plate |
| 9 | ∞ | — | — | — | |

*designates the aspherical surface which is rotationally symmetrical with respect to the optical axis.

Aspherical surface data (the aspherical surface coefficients not indicated are zero (0.00)):
Surface No.4
  K=$-0.241955 \times 10^{2}$
  A=$-0.425189 \times 10^{-1}$
  B=$0.735568 \times 10^{-2}$
Surface No.5
  K=$-0.634056 \times 10$
  A=$-0.431251 \times 10^{-1}$
  B=$0.491205 \times 10^{-2}$
  C=$0.185396 \times 10^{-2}$
  D=$-0.916169 \times 10^{-4}$
Surface No.6
  K=$0.181290 \times 10$
  A=$-0.442938 \times 10^{-1}$
  B=$0.449622 \times 10^{-2}$
  C=$-0.123485 \times 10^{-3}$
  D=$-0.338543 \times 10^{-4}$
Surface No.7
  K=$-0.416213 \times 10$
  A=$-0.149446 \times 10^{-1}$
  B=$-0.121509 \times 10^{-2}$
  C=$0.288194 \times 10^{-3}$
  D=$-0.192652 \times 10^{-4}$

Embodiment 6

Figure 11:
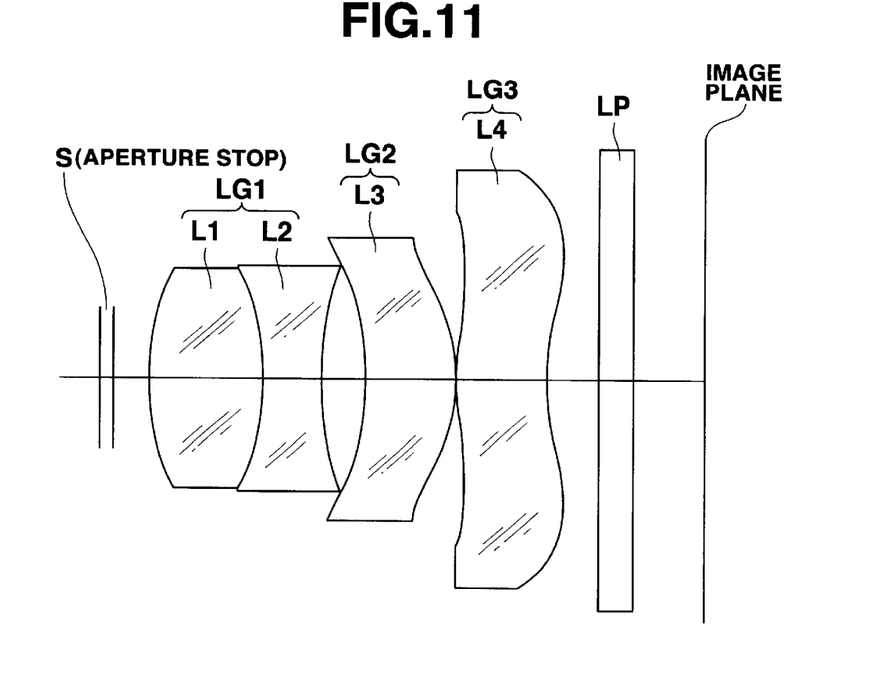
FIG. 11 is a lens arrangement of a photographing lens system according to a sixth embodiment of the present invention.
Figure 12A:
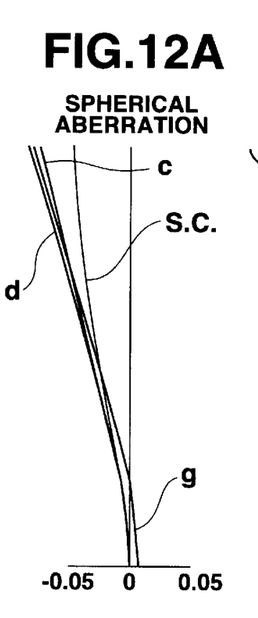
FIGS. 12A, 12B and 12C show aberrations occurred in the photographing lens system shown in FIG. 11.
Figure 12B:
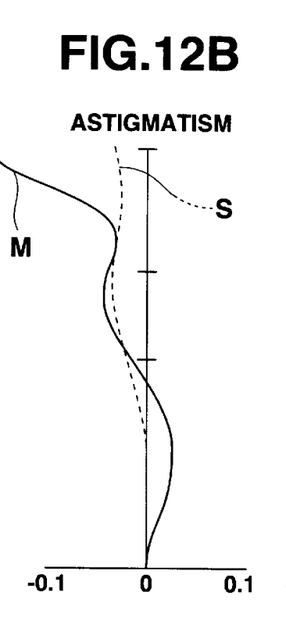
Figure 12C:
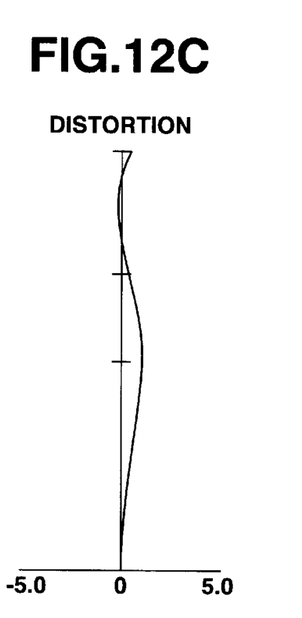

FIG. 11 is the lens arrangement of the photographing lens system according to the sixth embodiment of the present invention. Table 6 shows the numerical values for the photographing lens system according to the sixth embodiment. FIGS. 12A to 12C show aberrations occurred in the photographing lens system shown in FIG. 11 and Table 6.

TABLE 6

$f = 5.70$
$F_{NO} = 2.85$
$2\omega = 61.34°$
$b_f = 1.97$

| Surf.No. | R | D | $N_d$ | $v_d$ | |
|---|---|---|---|---|---|
| S1 | ∞ | 0.20 | — | — | Aperture Stop |
| S2 | ∞ | 0.18 | — | — | |
| 1 | 3.530 | 1.40 | 1.83500 | 42.98 | 1ˢᵗ Lens Group |
| 2 | −3.704 | 0.93 | 1.75520 | 27.53 | |
| 3 | 4.570 | 0.68 | — | — | |
| 4* | −3.704 | 1.21 | 1.49241 | 57.93 | 2ⁿᵈ Lens Group |
| 5* | −2.502 | 0.03 | — | — | |
| 6* | 4.536 | 1.23 | 1.49241 | 57.93 | 3ʳᵈ Lens Group |
| 7* | 3.333 | 0.64 | — | — | |
| 8 | ∞ | 0.50 | 1.51680 | 64.20 | Plane-Parallel Plate |
| 9 | ∞ | — | — | — | |

*designates the aspherical surface which is rotationally symmetrical with respect to the optical axis.

Aspherical surface data (the aspherical surface coefficients not indicated are zero (0.00)):
Surface No.4
  K=$-0.293229 \times 10^{2}$
  A=$-0.516787 \times 10^{-1}$
  B=$0.743241 \times 10^{-2}$
Surface No.5
  K=$-0.755748 \times 10$
  A=$-0.531503 \times 10^{-1}$
  B=$0.701883 \times 10^{-2}$
  C=$0.907434 \times 10^{-3}$
  D=$0.775339 \times 10^{-4}$
Surface No.6
  K=$0.213089 \times 10$
  A=$-0.518298 \times 10^{-1}$
  B=$0.633041 \times 10^{2}$
  C=$-0.437192 \times 10^{-3}$
  D=$-0.555609 \times 10^{-5}$
Surface No.7
  K=$-0.111282 \times 10^{2}$
  A=$-0.967199 \times 10^{-2}$
  B=$-0.229224 \times 10^{-2}$
  C=$0.361133 \times 10^{-3}$
  D=$-0.229469 \times 10^{-4}$

Embodiment 7

Figure 13:
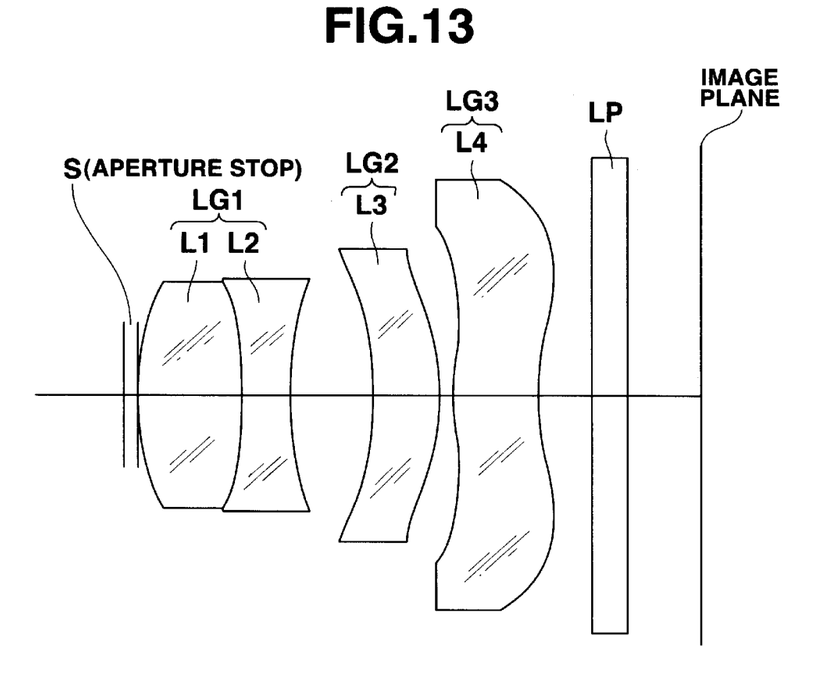
FIG. 13 is a lens arrangement of a photographing lens system according to a seventh embodiment of the present invention.
Figure 14A:
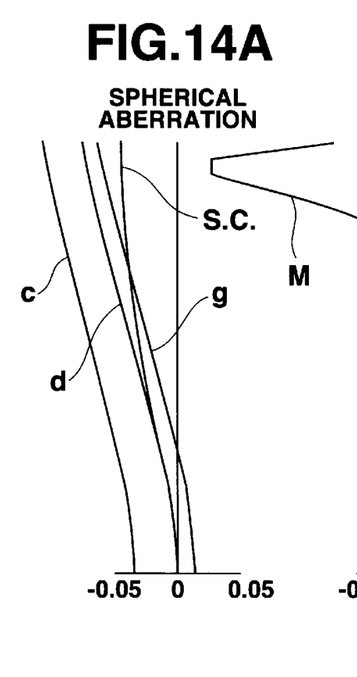
FIGS. 14A, 14B and 14C show aberrations occurred in the photographing lens system shown in FIG. 13.
Figure 14B:
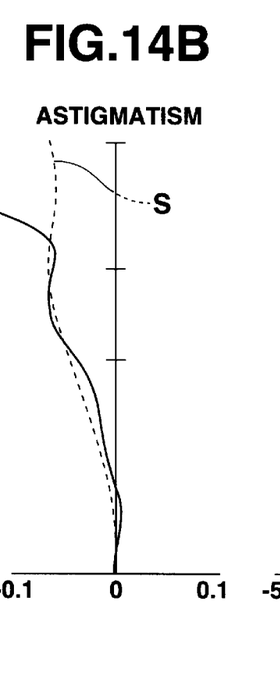
Figure 14C:
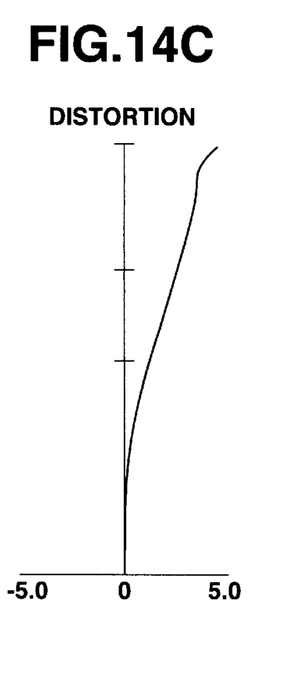

FIG. 13 is the lens arrangement of the photographing lens system according to the seventh embodiment of the present invention. Table 7 shows the numerical values for the photographing lens system according to the seventh embodiment. FIGS. 14A to 14C show aberrations occurred in the photographing lens system shown in FIG. 13 and Table 7.

TABLE 7 f = 5.52
$F_{NO}$ = 2.85
$2\omega$ = 61.13°
$b_f$ = 1.94

| Surf.No. | R | D | $N_d$ | $v_d$ | |
|---|---|---|---|---|---|
| S1 | ∞ | 0.20 | — | — | Aperture Stop |
| S2 | ∞ | 0.00 | — | — | |
| 1 | 3.003 | 1.26 | 1.77250 | 49.62 | 1st Lens Group |
| 2 | −6.899 | 0.50 | 1.69895 | 30.05 | |
| 3 | 4.953 | 0.98 | — | — | |
| 4* | −3.378 | 0.81 | 1.49241 | 57.93 | 2nd Lens Group |
| 5* | −2.500 | 0.14 | — | — | |
| 6* | 4.273 | 1.00 | 1.49241 | 57.93 | 3rd Lens Group |
| 7* | 2.820 | 0.61 | — | — | |
| 8 | ∞ | 0.50 | 1.51680 | 64.20 | Plane-Parallel |
| 9 | ∞ | — | — | — | Plate |

*designates the aspherical surface which is rotationally symmetrical with respect to the optical axis.

Aspherical surface data (the aspherical surface coefficients not indicated are zero (0.00)):
Surface No.4
  K=−0.376833×10²
  A=−0.458409×10⁻¹
  B=0.741230×10⁻²
Surface No.5
  K=−0.168226×10²
  A=−0.527385×10⁻¹
  B=0.710354×10⁻²
  C=0.213133×10⁻²
  D=0.746540×10⁻⁴
Surface No.6
  K=0.316915×10
  A=−0.683856×10⁻¹
  B=0.512184×10⁻²
  C=−0.110503×10⁻³
  D=−0.156553×10⁻³
Surface No.7
  K=−0.200100×10²
  A=−0.758354×10⁻²
  B=−0.461183×10⁻²
  C=0.955984×10⁻³
  D=−0.876261×10⁻⁴

Embodiment 8

Figure 15:
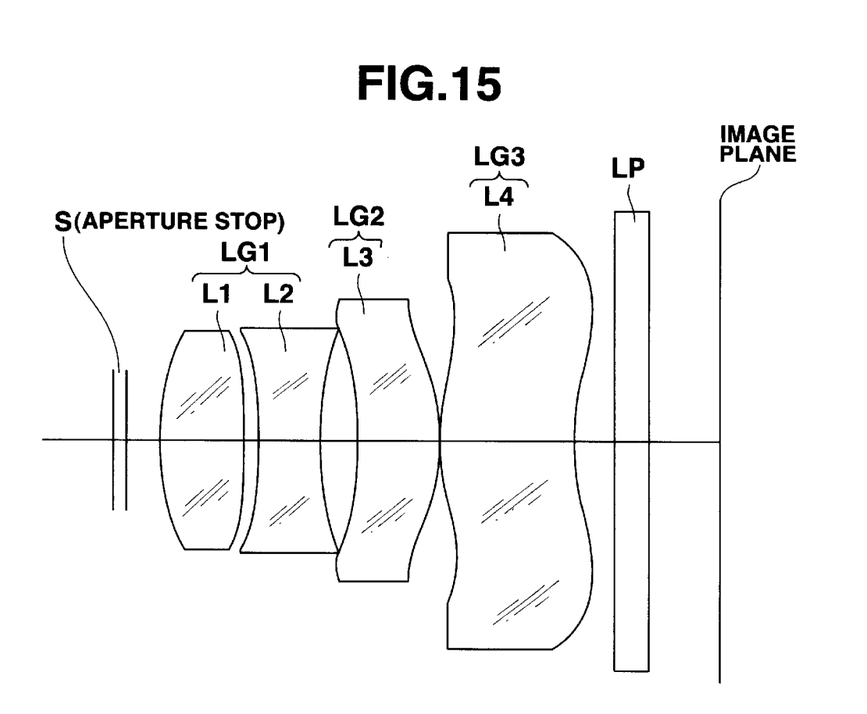
FIG. 15 is a lens arrangement of a photographing lens system according to an eighth embodiment of the present invention.
Figure 16A:
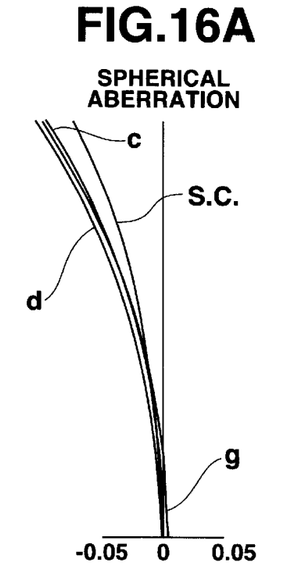
FIGS. 16A, 16B and 16C show aberrations occurred in the photographing lens system shown in FIG. 15.
Figure 16B:
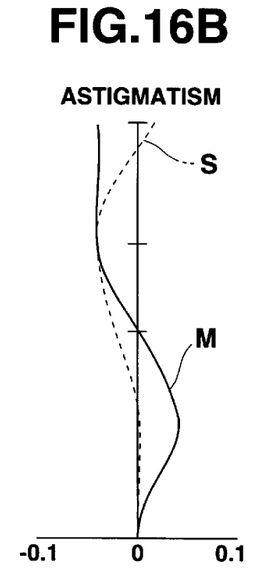
Figure 16C:
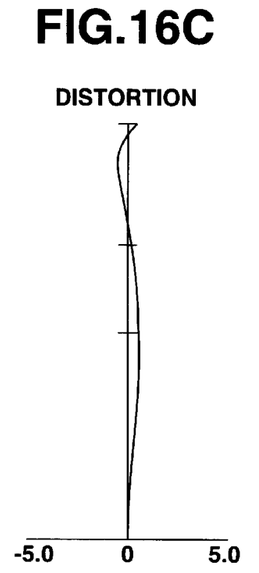

FIG. 15 is the lens arrangement of the photographing lens system according to the eighth embodiment of the present invention. Table 8 shows the numerical values for the photographing lens system according to the eighth embodiment. FIGS. 16A to 16C show aberrations occurred in the photographing lens system shown in FIG. 15 and Table 8.

TABLE 8 f = 5.58
$F_{NO}$ = 2.85
$2\omega$ = 62.51°
$b_f$ = 1.83

| Surf.No. | R | D | $N_d$ | $v_d$ | |
|---|---|---|---|---|---|
| S1 | ∞ | 0.18 | — | — | Aperture Stop |
| S2 | ∞ | 0.50 | — | — | |
| 1 | 3.704 | 1.18 | 1.83500 | 42.98 | 1st Lens Group |

TABLE 8-continued

| 2 | −6.904 | 0.15 | — | — | |
|---|---|---|---|---|---|
| 3 | −5.593 | 0.95 | 1.84666 | 23.78 | |
| 4 | 7.170 | 0.42 | — | — | |
| 5* | −4.000 | 1.21 | 1.49241 | 57.93 | 2nd Lens Group |
| 6* | −2.500 | 0.03 | — | — | |
| 7* | 5.452 | 1.87 | 1.49241 | 57.93 | 3rd Lens Group |
| 8* | 4.000 | 0.50 | — | — | |
| 9 | ∞ | 0.50 | 1.51680 | 64.20 | Plane-parallel |
| 10 | ∞ | — | — | — | Plate |

*designates the aspherical surface which is rotationally symmetrical with respect to the optical axis.

Aspherical surface data (the aspherical surface coefficients not indicated are zero (0.00)):
Surface No.5
  K=−0.110565×10²
  A=0.548387×10⁻³
  B=0.210616×10⁻²
Surface No.6
  K=−0.472456×10
  A=−0.107064×10⁻¹
  B=0.555987×10⁻²
  C=−0.435945×10⁻³
  D=0.949237×10⁻⁴
Surface No.7
  K=−0.114934×10²
  A=−0.567516×10⁻²
  B=−0.572103×10⁻³
  C=0.827357×10⁻⁴
  D=−0.411144×10⁻⁴
Surface No.8
  K=−0.806059×10
  A=−0.115340×10⁻¹
  B=0.106108×10⁻²
  C=−0.180756×10⁻³
  D=0.630558×10⁻⁵

Embodiment 9

Figure 17:
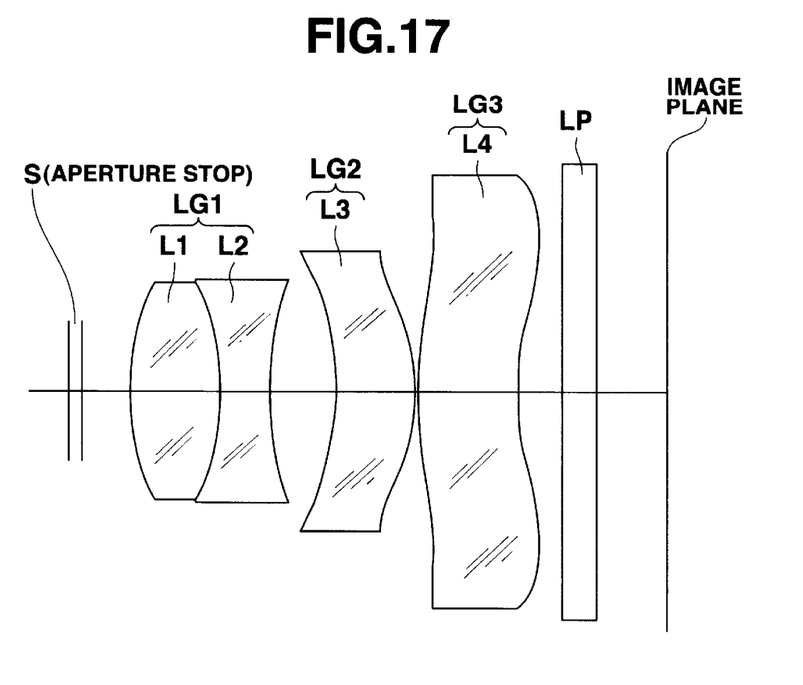
FIG. 17 is a lens arrangement of a photographing lens system according to a ninth embodiment of the present invention.
Figure 18A:
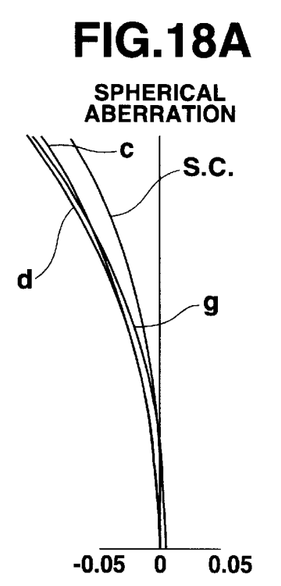
FIGS. 18A, 18B and 18C show aberrations occurred in the photographing lens system shown in FIG. 17.
Figure 18B:
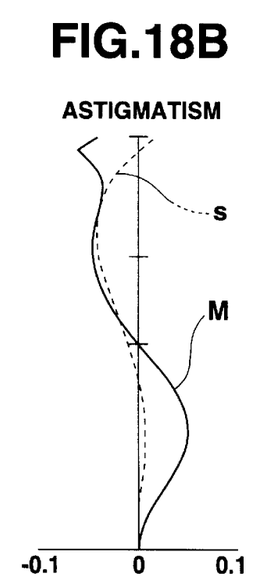
Figure 18C:
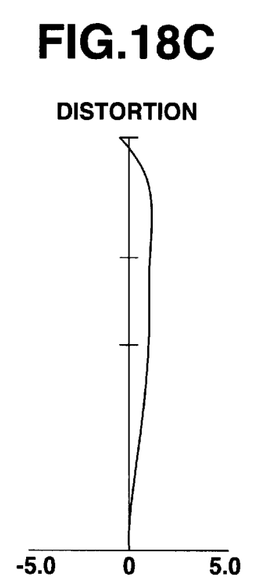

FIG. 17 is the lens arrangement of the photographing lens system according to the ninth embodiment of the present invention. Table 9 shows the numerical values for the photographing lens system according to the ninth embodiment. FIGS. 18A to 18C show aberrations occurred in the photographing lens system shown in FIG. 17 and Table 9.

TABLE 9 f = 5.58
$F_{NO}$ = 2.85
$2\omega$ = 62.91°
$b_f$ = 1.93

| Surf.No. | R | D | $N_d$ | $v_d$ | |
|---|---|---|---|---|---|
| S1 | ∞ | 0.20 | — | — | Aperture Stop |
| S2 | ∞ | 0.70 | — | — | |
| 1 | 3.704 | 1.27 | 1.83500 | 42.98 | 1st Lens Group |
| 2 | −3.704 | 0.67 | 1.74077 | 27.76 | |
| 3 | 5.187 | 0.92 | — | — | |
| 4 | −4.425 | 1.12 | 1.49241 | 57.93 | 2nd Lens Group |
| 5* | −2.602 | 0.03 | — | — | |
| 6* | 5.273 | 1.39 | 1.49241 | 57.93 | 3rd Lens Group |
| 7* | 3.315 | 0.60 | — | — | |
| 8 | ∞ | 0.50 | 1.51680 | 64.20 | Plane-Parallel |
| 9 | ∞ | — | — | — | Plate |

TABLE 9-continued

*designates the aspherical surface which is rotationally symmetrical with respect to the optical axis.

Aspherical surface data (the aspherical surface coefficients not indicated are zero (0.00)):
Surface No.5
  $K=-0.324766\times10$
  $A=-0.154545\times10^{-1}$
  $B=0.749114\times10^{-2}$
  $C=-0.779269\times10^{-3}$
  $D=0.895130\times10^{-4}$
Surface No.6
  $K=-0.198308\times10^{2}$
  $A=-0.113152\times10-1$
  $B=0.330190\times10^{-2}$
  $C=-0.427202\times10^{-3}$
  $D=0.120958\times10^{-4}$
Surface No.7
  $K=-0.738649$
  $A=-0.294761\times10^{-1}$
  $B=0.333723\times10^{-2}$
  $C=-0.243027\times10^{-3}$
  $D=0.266214\times10^{-5}$ Embodiment 10

Figure 19:
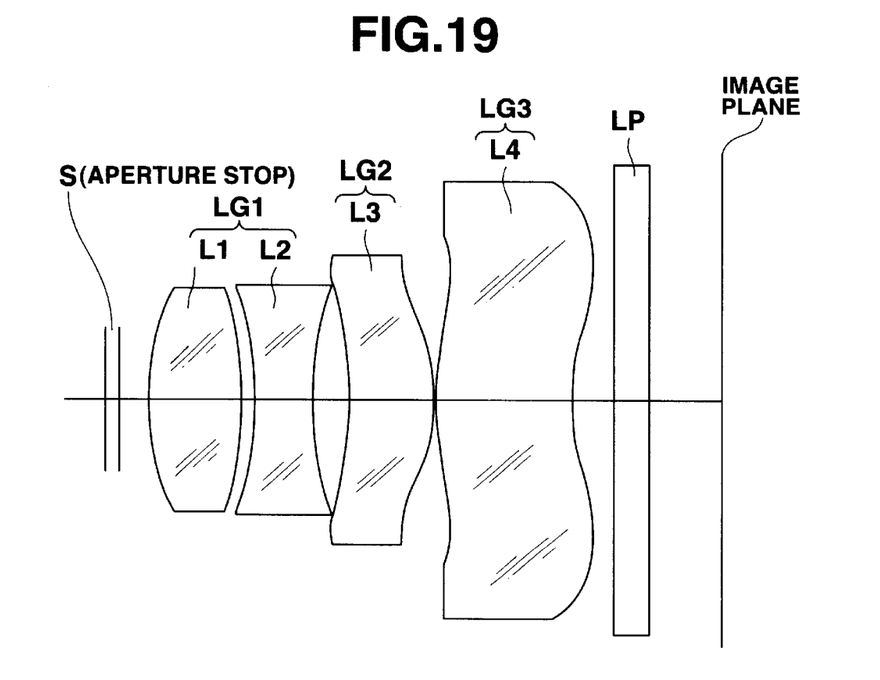
FIG. 19 is a lens arrangement of a photographing lens system according to a tenth embodiment of the present invention.
Figure 20A:
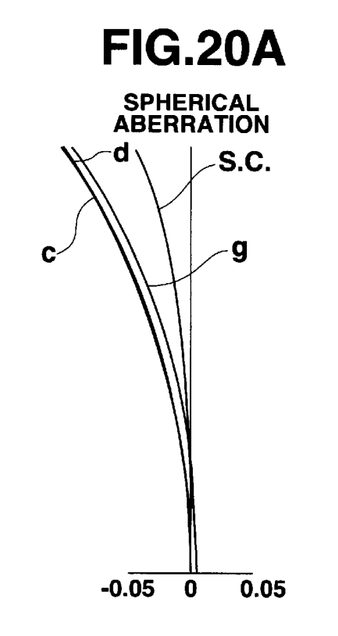
FIGS. 20A, 20B and 20C show aberrations occurred in the photographing lens system shown in FIG. 19.
Figure 20B:
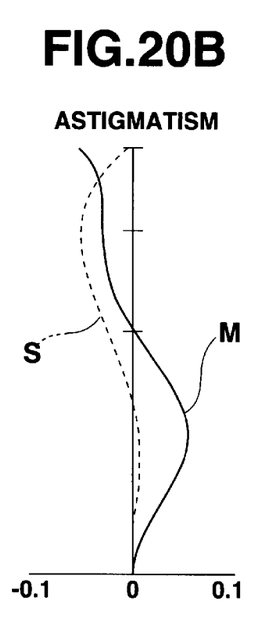
Figure 20C:
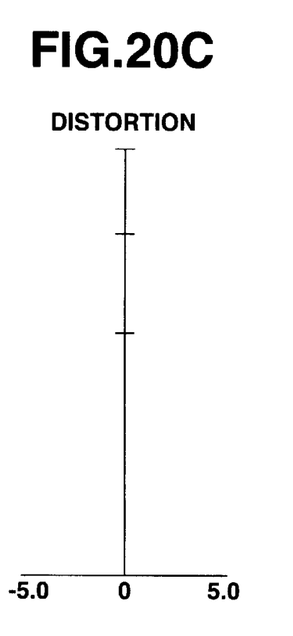

FIG. 19 is the lens arrangement of the photographing lens system according to the tenth embodiment of the present invention. Table 10 shows the numerical values for the photographing lens system according to the tenth embodiment. FIGS. 20A to 20C show aberrations occurred in the photographing lens system shown in FIG. 19 and Table 10.

TABLE 10 f = 5.58
$F_{NO}$ = 2.85
$2_\omega$ = 56.44°
$b_f$ = 1.90

| Surf.No. | R | D | $N_d$ | $v_d$ | |
|---|---|---|---|---|---|
| S1 | ∞ | 0.18 | — | — | Aperture Stop |
| S2 | ∞ | 0.82 | — | — | |
| 1 | 3.704 | 1.37 | 1.83500 | 42.98 | 1st Lens Group |
| 2 | −10.436 | 0.39 | — | — | |
| 3 | −6.581 | 0.71 | 1.84666 | 23.78 | |
| 4 | 4.348 | 0.58 | — | — | |
| 5 | −11.338 | 1.18 | 1.49241 | 57.93 | 2nd Lens Group |
| 6* | −2.044 | 0.03 | — | — | |
| 7 | 7.143 | 1.48 | 1.58300 | 30.05 | 3rd Lens Group |
| 8* | 4.000 | 0.57 | — | — | |
| 9 | ∞ | 0.50 | 1.51680 | 64.20 | Plane-Parallel |
| 10 | ∞ | — | — | — | Plate |

*designates the aspherical surface which is rotationally symmetrical with respect to the optical axis.

Aspherical surface data (the aspherical surface coefficients not indicated are zero (0.00)):
Surface No.6
  $K=-0.456272\times10$
  $A=-0.148413\times10^{-1}$
  $B=0.365980\times10^{-2}$
  $C=-0.277870\times10^{-3}$
  $D=0.974809\times10^{-4}$
Surface No.8
  $K=-0.270263\times10^{-2}$
  $A=-0.553463\times10^{-2}$
  $B=0.289483\times10^{-3}$
  $C=-0.461054\times10^{-4}$
  $D=0.211501\times10^{-5}$ Table 11 show the numerical values of conditions (1) through (8) for each of the first through tenth embodiments.

| | Embod.1 | Embod.2 | Embod.3 | Embod.4 | Embod.5 |
|---|---|---|---|---|---|
| Cond.(1) | 1.244 | 1.259 | 1.347 | 1.257 | 1.297 |
| Cond.(2) | 1.435 | 1.425 | 1.434 | 1.431 | 1.438 |
| Cond.(3) | 0.642 | 0.623 | 0.621 | 0.609 | 0.584 |
| Cond.(4) | 15.22 | 17.00 | 13.20 | 18.46 | 20.10 |
| Cond.(5) | 2.063 | 2.092 | 2.506 | 2.186 | 2.438 |
| Cond.(6) | 0.650 | 0.649 | 0.649 | 0.649 | 0.649 |
| Cond.(7) | 6.402 | 6.673 | 31.748 | 6.620 | 9.618 |
| Cond.(8) | 0.585 | 0.584 | 0.584 | 0.584 | 0.584 |

| | Embod.6 | Embod.7 | Embod.8 | Embod.9 | Embod.10 |
|---|---|---|---|---|---|
| Cond.(1) | 1.242 | 1.120 | 1.435 | 1.280 | 2.391 |
| Cond.(2) | 1.373 | 1.236 | 1.493 | 1.475 | 1.547 |
| Cond.(3) | 0.619 | 0.543 | 0.664 | 0.664 | 0.663 |
| Cond.(4) | 15.45 | 19.57 | 19.20 | 15.22 | 19.20 |
| Cond.(5) | 2.063 | 2.707 | 1.914 | 1.912 | 0.871 |
| Cond.(6) | 0.650 | 0.611 | 0.717 | 0.793 | 2.031 |
| Cond.(7) | 6.759 | 3.944 | 9.453 | 4.244 | 3.377 |
| Cond.(8) | 0.585 | 0.510 | 0.717 | 0.594 | 0.716 |

As can be understood from Table 11, the numerical values of each of the first through tenth embodiments satisfy each of conditions (1) through (8). Furthermore, as can be understood from the aberration diagrams of each embodiment, the various aberrations can be adequately corrected.

According to the above description, a compact photographing lens system, which has high resolution, and smaller number of lens elements, can be obtained.

What is claimed is:

1. A photographing lens system comprising an aperture stop, a first lens group, a second lens group, and a third lens group, in this order from an object side;

wherein said first lens group comprises a positive first lens element, and a negative second lens element that is cemented to or separate from said positive first lens element;

wherein said second lens group comprises a positive third lens element having an aspherical surface formed on at least one refractive surface thereof;

wherein said third lens group comprises a negative fourth lens element having an aspherical surface formed on at least one refractive surface thereof; and wherein said photographing lens system satisfies condition (1) with respect to the power of said first lens group, and satisfies condition (2) with respect to the dimensions of the entire photographing lens system along the optical axis:

$0.8 < f_I/f < 2.8$     (1)

$TL/f < 1.7$     (2)

wherein f designates the focal length of the entire photographing lens system;

$f_I$ designates the focal length of said first lens group; and

TL designates the distance between the most object-side surface of said aperture stop and the image plane.

2. The photographing lens system according to claim 1, wherein said photographing lens system further comprises a plane-parallel plate;
   wherein the thickness of said plane-parallel plate is calculated as a reduced distance when said TL is calculated.

3. The photographing lens system according to claim 1, wherein said positive first lens element of said first lens group satisfies condition (3) with respect to the shape of the object-side surface of said positive first lens element;
   wherein said positive first lens element and said negative second lens element of said first lens group satisfy condition (4) with respect to the Abbe number:

$$0.45 < r_{I-1}/f < 0.8 \tag{3}$$

$$10 < v_{I-1} - v_{I-2} < 25 \tag{4}$$

wherein
   $r_{I-1}$ designates the radius of curvature on the object-side surface of said positive first lens element;
   $v_{I-1}$ designates the Abbe number of said positive first lens element; and
   $v_{I-2}$ designates the Abbe number of said negative second lens element.

4. The photographing lens system according to claim 3, wherein said second lens group satisfies condition (5) with respect to the power thereof;
   wherein said positive third lens element of said second lens group satisfies condition (6) with respect to the shape of the object-side refractive surface thereof;

$$0.7 < f_{II}/f < 3.5 \tag{5}$$

$$0.5 < |r_{II-1}|/f < 3.0 \ (r_{II-1} < 0) \tag{6}$$

wherein
   $f_{II}$ designates the focal length of said second lens group; and
   $r_{II-1}$ designates the radius of curvature on the object-side surface of said positive third lens element.

5. The photographing lens system according to claim 3, wherein said third lens group satisfies condition (7) with respect to the power thereof;
   wherein said negative fourth lens element of said third lens group satisfies condition (8) with respect to the shape of the image-side refractive surface thereof;

$$2.5 < |f_{III}|/f < 50 \ (f_{III} < 0) \tag{7}$$

$$0.5 < r_{III-2}/f < 1.5 \tag{8}$$

wherein
   $f_{III}$ designates the focal length of said third lens group; and
   $r_{III-2}$ designates the radius of curvature on the image-side surface of said negative fourth lens element.

6. The photographing lens system according to claim 3, wherein said positive third lens element of said second lens group and said negative fourth lens element of said third lens group are made from a resin material.

7. The photographing lens system according to claim 1, wherein said second lens group satisfies condition (5) with respect to the power thereof;
   wherein said positive third lens element of said second lens group satisfies condition (6) with respect to the shape of the object-side refractive surface thereof;

$$0.7 < f_{II}/f < 3.5 \tag{5}$$

$$0.5 < |r_{II-1}|/f < 3.0 \ (r_{II-1} < 0) \tag{6}$$

wherein
   $f_{II}$ designates the focal length of said second lens group; and
   $r_{II-1}$ designates the radius of curvature on the object-side surface of said positive third lens element.

8. The photographing lens system according to claim 7, wherein said third lens group satisfies condition (7) with respect to the power thereof;
   wherein said negative fourth lens element of said third lens group satisfies condition (8) with respect to the shape of the image-side refractive surface-thereof;

$$2.5 < |f_{III}|/f < 50 \ (f_{III} < 0) \tag{7}$$

$$0.5 < r_{III-2}/f < 1.5 \tag{8}$$

wherein
   $f_{III}$ designates the focal length of said third lens group; and
   $r_{III-2}$ designates the radius of curvature on the image-side surface of said negative fourth lens element.

9. The photographing lens system according to claim 7, wherein said positive third lens element of said second lens group and said negative fourth lens element of said third lens group are made from a resin material.

10. The photographing lens system according to claim 1, wherein said third lens group satisfies condition (7) with respect to the power thereof;
    wherein said negative fourth lens element of said third lens group satisfies condition (8) with respect to the shape of the image-side refractive surface thereof;

$$2.5 < |f_{III}|/f < 50 \ (f_{III} < 0) \tag{7}$$

$$0.5 < r_{III-2}/f < 1.5 \tag{8}$$

wherein
    $f_{III}$ designates the focal length of said third lens group; and
    $r_{III-2}$ designates the radius of curvature on the image-side surface of said negative fourth lens element.

11. The photographing lens system according to claim 10, wherein said positive third lens element of said second lens group and said negative fourth lens element of said third lens group are made from a resin material.

12. The photographing lens system according to claim 1, wherein said positive third lens element of said second lens group and said negative fourth lens element of said third lens group are made from a resin material.

\* \* \* \* \*